E. Brown,

Piano.

No. 19 . Reissued Dec. 31, 1839

AM. PHOTO-LITHO. CO. N.Y. (OSBORNE'S PROCESS)

BEST AVAILABLE COPY

UNITED STATES PATENT OFFICE.

EDWIN BROWN, OF BOSTON, MASSACHUSETTS.

IMPROVEMENT IN PIANO-FORTES, CONSISTING OF A NEW MODE OF EFFECTING THE ONE-STRING CHANGE.

Specification forming part of Letters Patent No. 1,014, dated November 20, 1838; Reissue No. 19, dated December 31, 1839.

*To all whom it may concern:*

Be it known that I, EDWIN BROWN, of Boston, in the county of Suffolk and Commonwealth of Massachusetts, have invented new and useful Improvements in Piano-Fortes.

These improvements, the principles thereof, the application of said principles by which the same may be distinguished from other inventions, the manner of using the same, together with such parts, improvements, or combinations I claim to be my inventions and hold to be original and new, I have hereinafter set forth and described, which description taken in connection with the accompanying drawings herein referred to, composes my specification.

Figure 1:
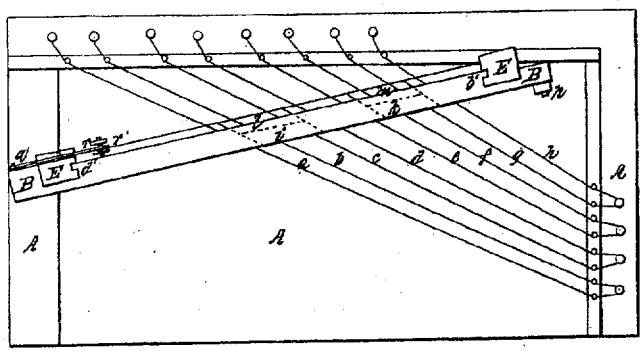
Figure 2:
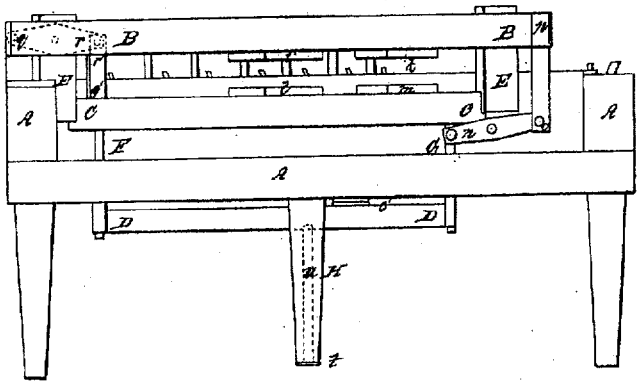
Figure 3:
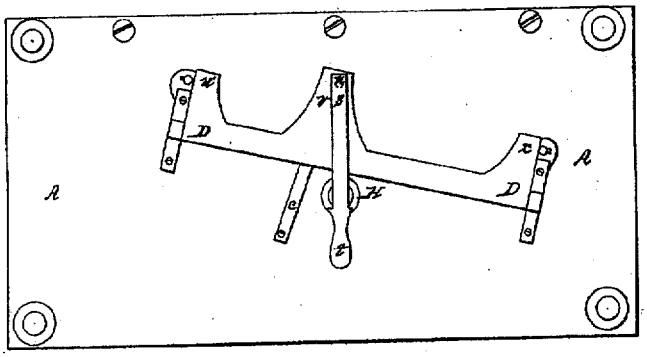

Figures 1, 2, 3 represent my improvements. Fig. 1 is a top view. Fig. 2 is a front elevation, and Fig. 3 a view of the under side or bottom of the piano-forte.

The object of my invention is to effect what is termed the "single-string change" of the hammers without any lateral motion of the hammers, as has usually been the practice heretofore. It has been necessary to fit and arrange these hammers very nicely in order to insure their perfect action when changed from the double to the single string. By my improvement one of the strings of each note is clamped or held, and thus prevented from vibrating when the hammer strikes it. The other, being free, will vibrate and produce the sound. The machinery by which I effect the above operation may be described as follows:

A A A, Figs. 1, 2, 3, represent the frame-work or body of the piano, constructed in the usual manner, or in any other way to suit the arrangement of my improvements.

*a b c d e f g h*, Fig. 1, are the strings or wires, which are stretched over the sounding-board in the usual manner by being attached to metallic pins on the side and back of the piano, the latter being those by means of which the strings are strained or tuned.

B B, Figs. 1, 2, is a long beam constructed of wood or other proper material, and extending over the strings or wires. This beam has dampers or cushions *i k*, covered with wash-leather or other suitable material, attached to its under side.

C C is another beam of similar construction to B B extending under the strings, and placed a little in the rear of the upper beam or farther toward the back of the piano, so that the cushions or dampers may always more effectually clamp the strings. This beam has also attached to it the dampers or cushions *l m*, similar to those above mentioned. These beams are connected together by means of the compound levers *no op qr q'r'*, Fig. 2, as represented therein, and are made to slide up and down in guide grooves *a' b'*, cut in the upright posts E E, Figs. 1, 2, constructed of wood, iron, or other suitable material. The beam C C is connected by means of the arms or uprights F G, Fig. 2, with a shaft, D D, underneath the piano, the journals of which rest and move in bearings attached to the under side of the frame-work, as seen in Fig. 3.

This shaft is operated by the lever-pedal *s t*, which has a fulcrum in the bottom of the leg or fixture H, projecting from the under side of the piano. When these levers are acted upon, the beams B B C C, together with the cushions or dampers *i k l m*, are brought toward each other, and press between them or confine the strings *b c f g*, thus checking their vibrations when struck by the hammers, and leaving only the strings *a d e h* to produce the sounds. It will be necessary to observe, also, that the hammers strike against the strings directly behind the places where they are pressed upon by the cushions or dampers of the lower beam, thus effectually preventing any vibration.

A great advantage consequent on the arrangement above described is diminishing the liability in the instrument of getting out of tune, as by this improvement all the strings are equally acted upon by the hammers, whereas in other modes, particularly where a lateral movement is given to the hammers to change them from the double to the single string, some of the strings are struck more than the rest, so that the instrument soon becomes out of tune. This improvement has likewise another advantage over other arrangements for the same purpose, inasmuch as it can be applied to the smaller-sized pianos in which the scales are more compact than in those in which the other modes are adopted. This arrangement also supersedes the necessity of using what are termed "mutes" in tuning the instrument.

The manner in which the beams and levers are operated may be described as follows: The musician bears his foot on one end, *t*, of the lever-pedal *s t*, Fig. 3, which presses the connecting-rod *u*, Fig. 2, against the arm *v* of the shaft D D, thereby raising it, together with the arms *w x*. To the sides of the arms *w x* are attached, by means of pins which allow them to move easily, the upright rods F G, the tops of which press against the bottom of the beam C C, thus raising it in the guide-grooves *a′ b′*. Near the top of the upright rod G is attached in a proper manner one end, *n*, of the lever *no op*, so that when the rod G is raised it depresses the end *o* of the lever, and at the same time brings down one end of the beam B B in the guide-grooves *a′ b′* by means of the arm *op* of the compound lever, which is attached to it at *p*. The other end is brought down at the same time and in the same manner by the compound lever *qr q′r′*, as shown in Fig. 2. There is a spring, C′, attached to the under side of the frame, as represented in the drawings, or in any other suitable manner, which spring causes the shaft D D and the parts connected thereto to return to their original position when the pressure of the foot is removed from the pedal, and thus relieves the string, so that the hammers shall cause all to vibrate. Only one of the beams, either the upper one, B B, or the lower one, C C, may be used instead of both, though the use of both, as above described, is decidedly preferable, as the wire is in that case less liable to be stretched, and the vibrations of the wire are more completely prevented, and the performer can operate the two beams with the same facility as one.

The mode of constructing the instrument with only one beam, whether the upper one, B B, or the lower one, C C, will be obvious to any instrument-maker from the above description of the two and their appendages.

Having thus fully described and set forth the nature of my improvements, I shall claim in the same as follows:

1. Clamping the strings between cushions or dampers situated with regard to each other and affixed on bars or beams in the manner hereinabove set forth.

2. Preventing the vibration of one of the strings of all the notes which have two strings, and allowing the other to vibrate, so as to effect what is termed a "one-string change" for producing a piano-tone by the use of only one of the beams, either B B or C C, as above described.

In testimony that the above is a true description of my said inventions and improvements I have hereto set my hand this 26th day of September, in the year of our Lord 1839.

EDWIN BROWN.

Witnesses:
RICHD. ROBINS,
SILAS ALLEN, Jr.